United States Patent [19]

Falbe et al.

[11] 4,048,233
[45] Sept. 13, 1977

[54] PROCESS FOR PREPARING A SYNTHESIS GAS SUITABLE AS STARTING MATERIAL FOR THE OXO-SYNTHESIS

[75] Inventors: Jurgen Falbe, Dinslaken; Heinz-Dieter Hahn, Oberhausen-Sterkrade-Nord, both of Germany

[73] Assignee: Ruhrchemie Aktiengesellschaft, Oberhausen-Holten, Germany

[21] Appl. No.: 636,790

[22] Filed: Dec. 2, 1975

Related U.S. Application Data

[63] Continuation of Ser. No. 421,318, Dec. 3, 1973, abandoned, which is a continuation of Ser. No. 869,898, Oct. 27, 1969, abandoned.

[30] Foreign Application Priority Data

Nov. 19, 1968 Germany .............................. 1809727

[51] Int. Cl.$^2$ .............................................. C07C 45/02
[52] U.S. Cl. .............................. 260/604 HF; 252/373
[58] Field of Search ................ 252/373; 260/604 HF, 260/597 A; 48/197

[56] References Cited

U.S. PATENT DOCUMENTS

| 3,451,949 | 6/1969 | Topsoe | 252/373 |
| 3,454,364 | 7/1969 | Storm | 252/373 |
| 3,556,751 | 1/1971 | Slater | 252/373 |

OTHER PUBLICATIONS

"The Chemistry of Isobutyraldehyde", Hagemeyer et al., (1953), pp. 3 and 55.

*Primary Examiner*—James O. Thomas, Jr.
*Assistant Examiner*—A. Siegel
*Attorney, Agent, or Firm*—Burgess, Dinklage & Sprung

[57] ABSTRACT

In an oxo process, a gas mixture of approximately equal amounts of hydrogen and carbon monoxide for re-use in the process is made by catalytically cracking the "thick oil" residue from the oxo step at elevated temperatures in presence of water vapor and carbon dioxide over a supported metal catalyst.

4 Claims, No Drawings

PROCESS FOR PREPARING A SYNTHESIS GAS SUITABLE AS STARTING MATERIAL FOR THE OXO-SYNTHESIS

This is a continuation of application Ser. No. 421,318, filed Dec. 3, 1973, now abandoned, which, in turn, is a continuation of application Ser. No. 869,898, filed Oct. 27, 1969, now abandoned.

PREAMBLE

Compounds containing carbon to carbon double linkages react with carbon monoxide and hydrogen in the presence of catalysts, especially cobalt carbonyl compounds. This reaction, the so called oxo-synthesis or hydroformylation, has become an increasingly important technical process for the production of aldehydes and alcohols containing one carbon atom more than the starting olefins (see. J. Falbe, Synthesen mit Kohlenmonoxyd, Berlin-Heidelberg-New York, 1967, page 3 ff).

The oxo reaction generally results in a mixture of several isomeric aldehydes. Single aldehydes are obtained only if olefinically unsaturated compounds which are symmetrical and incapable of isomerization of the olefinic bond are used as starting materials.

In the oxo synthesis, in addition to the main aldehyde products, various by products are formed by consecutive reactions of the primarily formed aldehydes and alcohols, as for instance acetals, aldols, esters and higher molecular weight alcohols which owing to their distillation characteristics, remain as distillation residues after the working up of the oxo reaction mixture. These higher boiling constituents, generally designated as "thick oil", can only partially be converted to valuable products. Furthermore, not any of the several isomeric aldehydes obtained as main product can be further processed with equally good results. For instance, n-butyraldehyde obtained by hydro-formylation of propylene represents a valuable starting material for numerous technical processes, but it has hitherto not been possible to economically use the isobutyraldehyde, which is formed in smaller amounts with the n-butyraldehyde.

There has been a need, therefore, for a process utilizing the higher boiling by-products of oxo-synthesis as well as the aldehydes thereof that are not suitable for further processing to economic advantage. It appears to be promising to convert such side products as well as the waste products of the oxo-synthesis under oxidizing conditions to a synthesis gas mixture consisting of hydrogen and carbon monoxide which, after addition of an olefin, can be used as the starting material for the oxo-synthesis.

Synthesis gases suitable as starting materials for the preparation of aldehydes from olefins generally consist of equal amounts of carbon monoxide and hydrogen, but in certain instances it is desirable to employ a small excess of hydrogen. For the preparation of alcohols by the oxo-process, however, hydrogen rich gas mixtures are used, e.g., those containing hydrogen and carbon monoxide in a molar ratio of at least 2:1.

Hydrogen and carbon monoxide containing synthesis gases are generally prepared by gasification of solid fuels with water vapor in presence or absence of oxygen, or by conversion of gaseous or liquid hydrocarbons with free or combined oxygen. These conventional processes, however, do not permit adapting the composition of the resulting gas mixtures in simple manner to that required for their intended use. Consequently, the adjustment of desired CO- and $H_2$-concentrations requires special process steps. There has been a desideratum, therefore, for a process which permits the preparation of a synthesis gas of adequate composition for the proper hydroformylation process without additional working procedures.

According to work carried out by S. K. Ho, Roy. Soc., A 276 (1967), 278 – 292 the thermal splitting of butyraldehyde yields products predominating in propane, carbon monoxide and hydrogen. Propylene is formed as side product which, as well as other olefins, inhibits the splitting of butyraldehyde and thus hinders the splitting process.

Furthermore, the catalytic splitting of isobutyraldehyde with formation of propylene, carbon monoxide and hydrogen in the presence of palladium or copper catalysts (see H. J. Hagemeyer, G. C. De Groess, The Chemistry of Isobutyraldehyde, Tennessee Eastman Comp. 1954, S. 55) is of small importance for commercial use, because the catalysts lose their activity even after short reaction times. Moreover, this process has the essential drawback that the initially formed propylene is further hydrogenated to less valuable propane, so that proplyene as well as hydrogen are lost.

THIS INVENTION

It has now been found that the production of a synthesis gas suitable for use in the oxo-syntheses, consisting essentially of carbon monoxide and hydrogen, can be obtained with good results by the catalytic splitting of carbon containing starting materials comprising essentially the side products and waste products of hydroformylation reactions. This splitting is carried out in presence of water vapor and carbon dioxide at 600 to 900° C at atmospheric or elevated pressure over a nickel-containing catalyst.

For the preparation of a synthesis gas mixture consisting of about equal parts by volume of carbon monoxide and hydrogen, it proved to be favorable to conduct the catalytic conversion of the carbon-containing starting materials in the presence of at least 1.5 moles water vapor and at least 1.6 moles carbon dioxide, respectively, per gram-atom carbon of the starting materials.

As side-products and waste-products of the oxo-syntheses for use in the present invention, isoaldehydes, which are unsuitble for further processing, as well as the distillation residues obtained by the working up of the hydroformylation products and consisting predominantly of higher alcohols, acetals, aldols and esters, are of interest.

The presence of water vapor is quite important to the present cracking process, in view of the temperatures used, 600 to 900° C. Constant catalyst activity even over long periods is assured by the presence of the water vapor, and the process can be operated essentially continuously. In contrast with the splitting of hydrocarbons, which can only be successfully effected in the presence of at least 3 moles of water vapor per gram-atom of carbon and which always results in hydrogen rich gas mixtures as reaction products, with the process according to this invention it is possible to decrease the minimum amount of water vapor required for the suppression of carbon deposits considerably by addition of carbon dioxide. The composition of the synthesis gas obtained from the side and waste products of the hydroformylation can be varied by controlling the amounts of water vapor and carbon dioxide employed in the splitting process.

The conversion is preferably carried out in presence of 1.5 to 2.5 moles of water vapor, and 1.6 to 3.0 moles of carbon dioxide, respectively, per gram-atom of carbon in the feed.

The spatial velocity at which the starting materials are passed over the stationary catalyst bed can be varied between wide limits independent of the pressure applied. Contacts times of as low as 0.40 seconds can be used, and times of 1.0 to 2.0 seconds have proved to be especially favorable at the preferred temperatures of from 700° to 800° C.

According to the invention, the conversion of the side- and waste-products of hydroformylation reactions are conducted at atmospheric as well as at elevated pressure up to 30 atmospheres gauges, preferably at a pressure range of 15 to 25 atmospheres gauge. However, at increased pressures the amount of saturated hydrocarbons, especially methane, in the product gas increase as compared with the products obtained at atmospheric pressure. At atmospheric pressure the carbon monoxide-hydrogen product mixture contains at utmost 0.8 percent saturated hydrocarbons, while its hydrocarbon content increases up to 3 percent, when the splitting is effected under increased pressures, to that an additional cracking step may be required.

The process according to the invention is conducted in the presence of supported nickel catalysts stable against water vapor Catalysts containing 2 to 25 weight percent nickel besides conventional carrier materials as for instance porous alumina, magnesia and if desired activators and bonding agents, as for instance cement, are especially well suited. Outstanding results are obtained with catalysts containing 5 to 20 percent nickel.

The apparatus for the practice of the process of this invention is uncomplex. The splitting can for instance be carried out in a conventional tube reactor, in which the catalyst is arranged as a fixed bed. Advantageously, the thick oil feed is heated together with the steam and the carbon dixoide to a temperature of between 500° to 650° C in a preheater and then introduced into the reactor, in order to attain uniform temperature conditions.

The carbon dioxide is partially converted during the course of the splitting reaction. The consumption of carbon dioxide depends upon the nature of the starting materials and amounts to about 0.40 to 0.50 m$^3$ (STP) carbon dioxide per kg thick oil.

The hot product gas exiting from the reactor is cooled and freed from condensed water in a separator. Non-converted carbon dioxide is removed from the product gas by conventional procedures as for instance by washing it with a solution of potassium carbonate or ethanolamine. Carbon dioxide desorbed from the washing liquid may be recirculated to the splitting reactor. Since the starting materials used according to the process of the invention are free of sulfur, an additional desulfurization of the reaction gas is unneccessary.

The process of the invention offers particular advantages if side- and waste-products of the hydroformylation of propylene are employed as starting materials. The amount of thick oil obtained from the hydroformylation of a certain amount of propylene proved generally adequate for the preparation of the total amount of synthesis gas required for the hydroformylation of a similar amount of propylene as well as for the satisfaction of the energy demand fr the gasification. Thus, no addition of synthesis gas of different origin is required.

While the process of the invention is particularly applicable to the preparation of synthesis gas for the oxo-synthesis as hereinbefore described, it will be appreciated that it can be applied in any other process requiring hydrogen and carbon monoxide containing gas mixtures.

EXAMPLES

The tests described in the following Examples 1 to 3 were effected in an equipment consisting essentially of preheater, reactor, cooler, separator and analyzing device.

EXAMPLE I 48 g isobutyraldehyde and 88 g water per hour (corresponding to 1.83 moles water per g-atom aldehyde carbon) were jointly vaporized in a preheater and heated together with 116 to 117 liters (STP) $CO_2$ to a temperature of 550° C. The resulting mixture was led at ordinary pressure from above downwards through a vertically arranged stainless steel tube (length 540 mm, diameter 32 mm), containing the catalyst. The catalyst had a grain size of 6 to 10 mm. Its composition, when formulated, was as follows (in weight percent):

18.5% nickel
8.3% Magnesium
16.8% aluminum
16.5% $SiO_2$
remainder: iron oxide, calcium oxide and alkali metal carbonates and alkali metal oxides.

The height of the catalyst charge was chosen in such manner that the isobutyraldehyde-water vapor mixture encountered the catalyst at a temperature of 630° to 650° C, while the highest temperature in the interior of the catalyst bed and the exit temperature of the product gas amounted to 800° to 810°. This temperature distribution was obtained with a catalyst charge of about 220 to 230 ml.

The cracked products and excess water vapor were subsequently intensively cooled to 0° to 2° C to separate out the water. Since the isobutyraldehyde splitting was complete, the separated water contained substantially no organic constituents.

Even after operating for several hundred hours no carbon black deposition on the catalyst was observed. The test results are listed in the following table.

| Test | 1 | 2 | 3 | 4 | 5 | 6 | 7 | 8 | 9 |
| --- | --- | --- | --- | --- | --- | --- | --- | --- | --- |
| Charge (Gases measured at STP) | | | | | | | | | |
| kg $H_2O$/kg isobutyraldehyde | 1.83 | 1.90 | 1.93 | 2.06 | 2.08 | 2.11 | 2.91 | 2.91 | 2.98 |
| m$^3$ $CO_2$/kg isobutyraldehyde | 2.43 | 2.53 | 2.59 | 2.52 | 2.58 | 2.85 | 4.10 | 3.69 | 3.44 |
| kg isobutyraldehyde/kg catalyst - hour | 0.22 | 0.14 | 0.18 | 0.13 | 0.14 | 0.13 | 0.14 | 0.14 | 0.13 |
| Yield/kg i-$C_4$al in m$^3$ | | | | | | | | | |
| $H_2$ | 1.66 | 1.70 | 1.66 | 1.69 | 1.77 | 1.73 | 1.68 | 1.74 | 1.77 |
| CO | 1.65 | 1.63 | 1.66 | 1.63 | 1.55 | 1.59 | 1.65 | 1.58 | 1.56 |

| Test | 1 | 2 | 3 | 4 | 5 | 6 | 7 | 8 | 9 |
|---|---|---|---|---|---|---|---|---|---|
| $CO_2$ | 2.04 | 2.13 | 2.16 | 2.09 | 2.18 | 2.45 | 3.67 | 3.29 | 3.04 |
| $CH_4$ | 0.032 | 0.022 | 0.027 | 0.022 | 0.028 | 0.023 | 0.035 | 0.026 | 0.032 |
| Total amount of product gas (m³) | 5.382 | 5.482 | 5.507 | 5.432 | 5.528 | 5.793 | 7.035 | 6.636 | 6.402 |
| Gas Composition in % by volume | | | | | | | | | |
| $H_2$ | 30.8 | 31.0 | 30.1 | 31.0 | 32.0 | 29.9 | 23.8 | 26.2 | 27.6 |
| CO | 30.7 | 39.7 | 30.1 | 30.1 | 28.1 | 27.4 | 23.5 | 23.8 | 24.3 |
| $CO_2$ | 37.9 | 38.9 | 39.3 | 38.5 | 39.4 | 42.3 | 52.2 | 49.6 | 47.6 |
| $CH_4$ | 0.6 | 6.4 | 0.5 | 0.4 | 0.5 | 0.4 | 0.5 | 0.4 | 0.5 |

EXAMPLE II 53.5 g of thick oil per hour originating from a propylene hydroformylation (elementary analysis: carbon 69.18 percent, hydrogen 12.12 percent, mean molecular weight 192) was reacted with water vapor and carbon dixyde over 250 ml of the nickel-catalyst, as described in Example I.

The following results were obtained from two tests (gases measured at STP).

| Charge (per 1 kg thick oil) | Charge (per 1 kg thicK oil) |
|---|---|
| 2.52 kg $H_2O$ | 3.10 kg $H_2O$ |
| 3.640 m³ $CO_2$ | 4.484 m³ $CO_2$ |
| Consumption of $CO_2$: 0.472 m³ | Consumption of $CO_2$: 0.524 m³ |
| Analysis of Product Gas: | Analysis of Product Gas: |
| $H_2$ 1.570 m³ = 24.1% | $H_2$ 1,700 m³ = 22.7% |
| CO 1.655 m³ = 25.5% | CO 1.766 m³ = 23.6% |
| $CO_2$ 3.168 m³ = 48.7% | $CO_2$ 3.960 m³ = 53.0% |
| $CH_4$ 0.112 m³ = 1.7% | $CH_4$ 0.053 m³ = 0.7% |

EXAMPLE III

A thick oil originating from an ethylene hydroformylation was cracked under the conditions described in Example I. This thick oil represented a mixture of several higher boiling compounds. Its composition was determined by elementary analysis as follows: carbon 66.12 percent, hydrogen 11.42 percent, mean molecular weight 213.

| Charge (per 1 kg thick oil) |
|---|
| 1.815 kg $H_2O$ |
| 2.650 m³ $CO_2$ |
| Consumption of $CO_2$: 0.470 m³ |
| Analysis of the product gas |
| $H_2$ 1.583 m³ = 28.9% |
| CO 1.660 m³ = 30.3% |
| $CO_2$ 2.180 m³ = 39.8% |
| $CH_4$ 0.044 m³ = 0.8% |

We claim:

1. In an oxo process wherein an olefin is hydroformylated to an oxygen-containing product having one or more carbon atom than said olefin, and wherein after recovery of said product there remains a thick oil residue comprising aldehydes, alcohols, acetals, aldols and esters, the improved method of converting said thick oil to useful product comprising cracking said thick oil over a supported nickel catalyst containing in the range of 2 to 25 weight percent nickel in the presence of in the range of 1.5 to 2.5 moles water vapor and 1.6 to 3.0 moles carbon dioxide per g-atom in said thick oil, and at a temperature in the range of 600° C to 900° C and a pressure in the range up to 30 atmospheres, recovering from the material so cracked a synthesis gas mixture consisting essentially of carbon monoxide and hydrogen, and controlling the amount and properties of said water vapor and carbon dioxide used to yield a hydrogen/carbon monoxide ratio in said synthesis gas mixture in the approximate range of 1:1 to 2:1 and recycling said hydrogen and carbon monoxide to said oxo process.

2. The process of claim 1 wherein said olefin is selected from the group consisting of propylene and ethylene.

3. The process of claim 2 wherein the recycled synthesis gas mixture, after initial start-up, is the sole synthesis gas supplied to said hydroformulation.

4. The process of claim 1 wherein said catalyst contains in the range of 5 to 20 weight percent nickel, said temperature is in the range of 700° C to 800° C and said pressure is in the range of 15 to 25 atm.

* * * * *

UNITED STATES PATENT AND TRADEMARK OFFICE
CERTIFICATE OF CORRECTION

PATENT NO. : 4,048,233
DATED : September 13, 1977
INVENTOR(S) : Jürgen Falbe et al It is certified that error appears in the above-identified patent and that said Letters Patent are hereby corrected as shown below:

Title Page, Inventors, "Jurgen" should read -- Jürgen --.
Column 2, line 48, "unsuitble" should read -- unsuitable --.
Column 3, line 17, "gauges" should read -- gauge --.
Column 3, line 30, insert -- . -- after "vapor".
Column 4, line 11, "fr" should read -- for --.
Column 5, line 29, "1,700" should read -- 1.700 --.

Signed and Sealed this

Sixteenth Day of May 1978

[SEAL]

Attest:

RUTH C. MASON
Attesting Officer

LUTRELLE F. PARKER
Acting Commissioner of Patents and Trademarks